US012810320B2

(12) United States Patent
Maiocco et al.

(10) Patent No.: US 12,810,320 B2
(45) **Date of Patent: *Nov. 24, 2026**

(54) SYSTEM AND METHOD FOR MANAGING INVENTORY STOCK FOR VARIABLE WEIGHTED AND VARIABLE PRICED AGRICULTURAL PRODUCTS

(71) Applicant: BARN2DOOR, INC., Seattle, WA (US)

(72) Inventors: Janelle Joy Maiocco, Seattle, WA (US); Jeremy MacRae, Seattle, WA (US); Samuel James San Nicolas, Seattle, WA (US); Geoff Schwab, Seattle, WA (US); Andrew Smith, Seattle, WA (US)

(73) Assignee: BARN2DOOR, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/502,791

(22) Filed: Nov. 6, 2023

(65) Prior Publication Data

US 2024/0070707 A1 Feb. 29, 2024

Related U.S. Application Data

(63) Continuation of application No. 17/590,345, filed on Feb. 1, 2022, now Pat. No. 11,810,144.
(Continued)

(51) Int. Cl.
*G06Q 30/02* (2023.01)
*G06Q 10/087* (2023.01)
(Continued)

(52) U.S. Cl.
CPC ....... *G06Q 30/0224* (2013.01); *G06Q 10/087* (2013.01); *G06Q 30/0236* (2013.01); *G06Q 30/0643* (2013.01)

(58) Field of Classification Search
CPC ............. G06Q 30/0224; G06Q 10/087; G06Q 30/0236; G06Q 30/0643; G06Q 30/0254;
(Continued)

(56) References Cited

U.S. PATENT DOCUMENTS

| | | | | |
|---|---|---|---|---|
| 8,086,498 | B2 * | 12/2011 | Rodriguez | G06Q 30/0641 705/26.1 |
| 8,864,025 | B2 * | 10/2014 | Bolanos | G06Q 10/08 235/375 |

(Continued)

FOREIGN PATENT DOCUMENTS

| | | | |
|---|---|---|---|
| CN | 113554480 A * | 10/2021 | G06Q 30/06 |
| WO | 2001046774 | 6/2001 | |

(Continued)

OTHER PUBLICATIONS

Bickey Kumar Shah; Vansh Kedia; Rahul Kumar Jha, Integrated Vendor-Managed Time Efficient Application to Production of Inventory Sysytems (English), 2021 6th International Conference on Inventive Computation Technologies (ICICT) (2021, pp. 275-280), Jan. 20, 2021 (Year: 2021).*

(Continued)

*Primary Examiner* — Marilyn G Macasiano
(74) *Attorney, Agent, or Firm* — K&L Gates LLP

(57) ABSTRACT

Systems and methods are described for managing inventory stock for variable weighted and variable priced agricultural products. A system includes a memory device storing a data structure that relates a plurality of available base unit values and a plurality of available base unit measurement types to each type of agricultural product type. The system also includes an interface controller configured to provide an interactive interface for a vendor. The interactive interface includes an agricultural product type field, a base unit values field, and a base unit measurement type field. The system further includes a processor that creates a product purchase
(Continued)

interactive interface using a selected agricultural product type, a selected base unit value, and a selected base unit measurement type to enable a buyer to purchase the agricultural product type in one or more increments of the base unit value at the base unit measurement type.

20 Claims, 9 Drawing Sheets

Related U.S. Application Data

(60) Provisional application No. 63/144,273, filed on Feb. 1, 2021.

(51) Int. Cl.
*G06Q 30/0207* (2023.01)
*G06Q 30/0601* (2023.01)

(58) Field of Classification Search
CPC .. G06Q 10/067; G06Q 30/0246; G06Q 30/02; G06Q 30/0207
See application file for complete search history.

(56) References Cited

U.S. PATENT DOCUMENTS

| | | | | |
|---|---|---|---|---|
| 9,881,278 | B2 * | 1/2018 | Christie | G06Q 10/08 |
| 11,367,093 | B2 * | 6/2022 | Perry | G06V 20/188 |
| 2001/0032165 | A1 * | 10/2001 | Friend | G06Q 40/04 705/26.1 |
| 2002/0010637 | A1 * | 1/2002 | Lieu | G06Q 30/0601 705/26.1 |
| 2007/0022024 | A1 * | 1/2007 | Dowty | G06Q 10/087 705/28 |
| 2008/0059330 | A1 * | 3/2008 | Stroman | G06Q 10/0631 705/37 |
| 2011/0208636 | A1 * | 8/2011 | Bachu | G06Q 30/06 705/37 |
| 2012/0226573 | A1 * | 9/2012 | Zakas | G06Q 30/0601 705/26.7 |
| 2019/0325466 | A1 * | 10/2019 | Perry | G05D 1/0214 |

FOREIGN PATENT DOCUMENTS

| | | | |
|---|---|---|---|
| WO | WO 2001/046774 A2 * | 6/2001 | G06Q 40/00 |
| WO | WO 2001/059676 A1 * | 8/2001 | G06Q 30/02 |
| WO | 20180217954 | 11/2018 | |
| WO | 20190209947 | 10/2019 | |
| WO | WO 2019/209947 A1 * | 10/2019 | G06Q 30/06 |

OTHER PUBLICATIONS

Lu Wang; Longqin Xu; Zhiying Zheng; Shuangyin Liu; Xiangtong Li; Liang Cao; Jingbin Li; Chuanheng Sun, Smart Contract-Based Agricultural Food Supply Chain Traceability (English), IEEE Access (vol. 9, 2021, pp. 9296-9307), Jan. 1, 2021 (Year: 2021).*

Khan, Prince Waqas; Byun, Yung-Cheol; Park, Namje, IoT-Blockchain Enabled Optimized Provenance System for Food Industry 4.0 Using Advanced Deep Learning, Sensors (Basel, Swirzerland), 20(10), 2990, May 25, 2020 (Year: 2020).*

M. Bichler; J. Kalagnanam; K. Katircioglu; A. J. King; R.D. Lawrence; H.S. Lee; G. Y. Lin; Y. Lu, Applications of flexible pricing in business-to-business electronic commerce (English); IBM Systems Journal (vol. 41, Issue: 2, pp. 287-302), Jan. 1, 2002 (Year: 2002).*

Matsuda, T.; Clark, T.H.; Ho Geun Lee, Electronic commerce for agriculture transactions: role of intermediaries and accurate pricing: (English), Preoceeding s of the THirtieth Hawaii International Conference on System Sciences (vol. 4, 1997, pp. 13-20vol.4), Jan. 1, 1997 (Year: 1997).*

Matsuda, T.; Clark, T.H.; Ho Geun Lee, Electronic commerce for agricultural transactions: role of intermediaries and accurate pricing (English), Proceedings of the Thirtieth Hawaii International Conference on System Sciences (vol. 4, pp. 13-20 vol.4), Jan. 1, 1997 (Year: 1997).

V. Jayaraman; T. Baker, The Internet as an enabler for dynamic pricing of goods (English), IEEE Transactions on Engineering Management (vol. 50, Issue: 4, pp. 470-477), Nov. 1, 2003 (Year: 2003).

Lu Wang; Longqin Xu; Zhiying Zheng; Shuangyin Liu; Xiangton Li; Liang Cao; Jingbin Li; Chuangheng Sun, Smart Contract-Based Agricultural Food Suplly Chain (English), IEEE Access (vol. 9, pp. 9296-9307), Jan. 1, 2021 (Year: 2021).

M. Bichler; J. Kalagnanam; K. Katircloglu; A.J. King; R.D. Lawrence; H.S. Lee; G.y. Lin; Y. Lu, Applications of flexible pricing in business-to-business electronic commerce (English), IBM Systems Journal (vol. 41, Issue: 2, pp. 287-302), Jan. 1, 2002 ( Year: 2002).

* cited by examiner

SYSTEM AND METHOD FOR MANAGING INVENTORY STOCK FOR VARIABLE WEIGHTED AND VARIABLE PRICED AGRICULTURAL PRODUCTS

PRIORITY CLAIM

The present application is a continuation application of U.S. patent application Ser. No. 17/590,345, filed Feb. 1, 2022, now U.S. Pat. No. 11,810,144, which claims priority to and the benefit of U.S. Provisional Patent Application No. 63/144,273, filed Feb. 1, 2021, the entirety of which are incorporated herein by reference.

BACKGROUND

Agricultural products, such as livestock, poultry, aquacultural, viticultural, horticultural, floricultural, silvicultural, and other farm crops, may be difficult to trade because the price of the final product may vary substantively at the time the final product is available for delivery to the buyer depending on the total amount available for harvesting/butchering. Also, the trade of agricultural products typically includes a payment of a deposit. Today, the transactions of the trade of the agricultural products are mainly managed manually, which may include a tedious tracking of inventory, deposits, and payments that are manually collated, calculated, and then invoiced for individual products and each buyer.

Although conventional online transaction platforms may provide an option of selling discrete goods/items, the conventional platforms do not account for the variable nature of the agricultural products, which may be offered for sale before they are grown or processed and before the final amount of the products for sale become available. Moreover, conventional online transaction platforms do not allow vendors to automatically adjust inventories for replenishment of perishable items. Further, conventional online transaction platforms do not enable vendors to create dynamic pricing models based on different types of buyers. Accordingly, it is difficult to manage agricultural product transactions using conventional online transaction platforms, and even if the conventional online transaction platforms are used, the transaction of the agricultural products may require a significant amount of manual management, which is error prone, time-consuming, and lengthens the payment cycle.

SUMMARY

The present disclosure provides a system, method, and apparatus for managing inventories of different types of agricultural products out of respective single stocks. The system, method, and apparatus are configured to establish (or enable a user to establish) a base unit for an agricultural product type. The base unit constitutes the smallest unit that is available for purchase and is specified in a measurement unit that is typical for the agricultural product being offered for sale. For example, a base unit for an animal may include a quarter, a sixth, an eighth, or a tenth of the animal. Selection of the base unit enables the system, method, and apparatus to provide a quantity field for a buyer that corresponds to a desired number of base units to be purchased. In the example above, a quantity of two for a quarter-animal base unit is determined by the system, method, and apparatus as a half-animal. For non-animal agricultural product types, base units may be specified in base unit measurement types, including but not limited to, e.g., ounces, pints, quarts, gallons, bushels, baskets, etc.

The use of defined base units enables agricultural products of varying unit sizes to be transacted through an automated online system without a vendor having to manually enter pricing information. In the example above, a steer can range in weight between 600 pounds to 1800 pounds. Even target weights for an animal for purchase can eventually vary by 20%. The system, method, and apparatus enable a vendor to specify a base unit that is independent of the weight variability to provide a more concrete management of inventory stock that reduces uncertainty between buyers and vendors and ultimately reduces unsold agricultural products.

In addition to above, the example system, method, and apparatus enable a vendor to provide dynamic pricing for different types of buyers through the same online platform. In an example, the system, method, and apparatus enable a vendor to specify a percentage increase or decrease from the base unit price for different buyer types. Buyer types may include, but are not limited to, e.g., a wholesaler (e.g. a distributors, Co-Ops, grocers, schools, hospitals, restaurants, etc.), a retailer, a guest, a frequent buyer, or a membership buyer. A base unit price may be provided for wholesale buyers, with different percentage (or multiple) increases for retail buyers, guest buyers, frequent buyers, or member buyers. The system, method, and apparatus accordingly enable a vendor to set different pricing levels from a base price to enable sales to different buyer types for different agricultural products through the same e-commerce platform.

The example system, method, and apparatus are also configured for dynamic inventory management. The system, method, and apparatus include one or more rules that are selectable by a vendor (or supplier to a vendor) that specify automatic replenishment of inventory per a custom time period. The amount of inventory replenishment may be defined in terms of base units for purchasing alignment. For example, the system, method, and apparatus enable a vendor to specify that 100 base units of a certain agricultural product are to be replenished in inventory every month between March and September based on known agricultural output. The system, method, and apparatus also enable the inventory to be carried over a number of time periods before being discarded from inventory. This configuration enables perishable agricultural products to be discarded from inventory automatically after a defined number of carry-overs are achieved, thereby reducing effort of a vendor to manually adjust available inventory after painstakingly counting the amount of non-perished product in a warehouse or storage shed.

In light of the present disclosure and the above aspects, it is therefore an advantage of the present disclosure to provide an e-commerce platform that enables a vendor to specify a base unit for different agricultural products.

It is another advantage of the present disclosure to provide an e-commerce platform that enables a vendor to specify cost change per a base unit for different agricultural products based on a type of buyer.

It is another advantage of the present disclosure to provide an e-commerce platform that provides for perishable inventory tracking and replenishment.

Additional features and advantages are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein and it is expressly contemplated to claim individual advantageous embodiments separately. Moreover, it should be noted that the language used in the specification has been selected principally for readability and instructional purposes, and not to limit the scope of the inventive subject matter.

DETAILED DESCRIPTION

Figure 1:
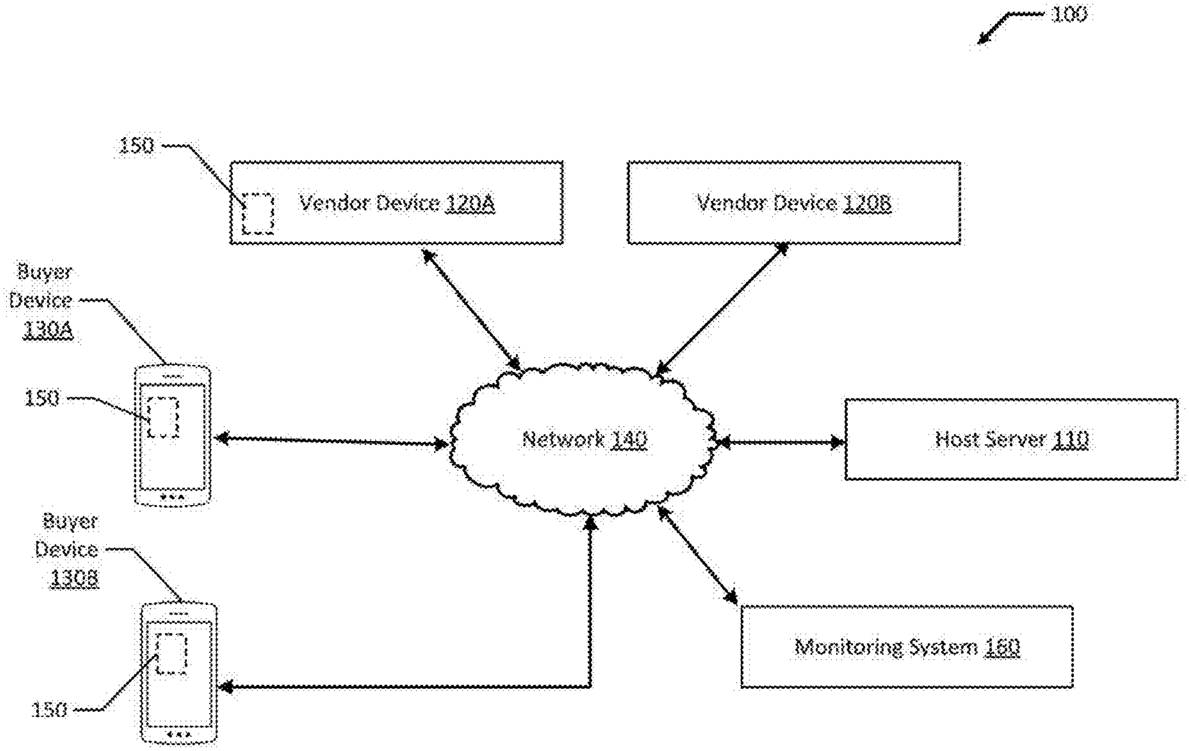
FIG. 1 shows an example system including a host server that enables inventory management for agricultural products, according to an example embodiment of the present disclosure.

The present disclosure relates in general to a method, system, and apparatus configured to provide automated management of agricultural product inventories. The example method, system, and apparatus are configured to provide automated management by providing options for a vendor to select a base unit and base unit price for an agricultural product. The use of a defined base unit enables a vendor to sell quantities of agricultural products from a single stock of inventory regardless of product weight or size variability.

As discussed herein, a base unit is the smallest unit that is available for purchase of a particular agricultural and is specified in a measurement unit (e.g., ounces, pints, quarts, gallons, bushels, baskets, pounds, a fraction of an animal, etc.) that is typical for the agricultural product being offered for sale. In some embodiments, the method, system, and apparatus determine a plurality of available base units and measurement unit types that are relevant for a selected agricultural product type. A vendor may select a base unit, measurement type, and corresponding price to define the base unit for their e-commerce platform. This flexibility enables different vendors that sell the same agricultural products to define their own base units that best suit their business. Further, the flexibility provided by the method, system, and apparatus enable different base units to be defined for different types of agricultural products.

In some embodiments, the method, system, and apparatus enable a vendor to provide an automated price change from a nominal price of a base unit based on a type of buyer. The price change may be a percentage increase, a percentage decrease, or a different price from the nominal price. The type of buyer may include a wholesaler, a retailer, a guest, a frequent buyer, or a membership buyer. The method, system, and apparatus accordingly enable a vendor to easily specify different prices for a base unit based on a type of purchaser through one e-commerce platform, without a separate system for certain buyers, such as wholesalers.

Further, as disclosed herein, the method, system, and apparatus use base units in inventory management. The method system, and apparatus enable a vendor to specify a custom replenishment time period (e.g., every week, every two weeks, every month, every six weeks, etc.) and replenishment quantity that corresponds to how quickly and frequently a certain type of agricultural product becomes available. Further, the method, system, and apparatus enable a vendor to specify perishable information, such as a number of time periods certain inventory can be carried over before being removed from inventory. This automated management saves a vendor time from having to manually assess and deduct perished products from inventory.

As used herein, agricultural products may refer to livestock, poultry, aquacultural, viticultural, horticultural, floricultural, silvicultural, other farm crops, or any other products offered for sale by a farmer, a fisherman, a rancher, a breeder, or a forager. Additionally, as used herein, a vendor may refer to any person that offers to sell or sells the agricultural products. As used herein, a buyer may refer to any person that offers to buy or purchases the agricultural products.

As used herein, a host server may refers to a server that is managed by a host (e.g., service provider, host server manager, application/website manager) to provide/upgrade/manage the functions performed by the components of the system 100 described herein.

Example Agricultural Marketplace System

FIG. 1 shows an example system 100 that enables inventory management for agricultural products, according to an example embodiment of the present disclosure. The system 100 may include a host server 110 that is configured to host one or more systems, algorithms, applications, websites, interactive interfaces, application programming interfaces ("APIs"), etc., that provide for the management of base unit pricing and/or inventories of various agricultural products of one or more vendors. The system 100 may also include one or more vendor devices 120A/B that are configured for the management of the agricultural products. The system 100 may further include one or more buyer devices 130A/B (e.g., user devices). While FIG. 1 shows two vendor devices 120A/B and two buyer devices 130A/B, the example host server 110 may be configured to operate or provide services for more vendor/buyer devices.

The one or more vendor devices 120A/B may include (e.g., as software), or may provide access to (e.g., via a cloud interface), any vendor's agricultural product management system. The one or more vendor devices 120A/B may include at least one memory device that stores instructions and at least one processor configured to execute the instructions. Execution of the instructions by the processor of the one or more vendor devices 120A/B enables the one or more vendor devices 120A/B to perform the operators described herein. The one or more vendor devices 120A/B may connect to the host server 110 via a network 140 (e.g., the Internet and/or a cellular network). The one or more vendor devices 120A/B may receive, store, and/or provide product information related to the pricing and/or inventory for the agricultural products. The product information may include a product description, at least one price per unit, and inventory replenishment/carryover information.

The one or more vendor devices 120A/B may comprise any processor, computer, workstation, laptop computer, smartphone, tablet computer, etc. In some examples, the one or more vendor devices 120A/B may be communicatively coupled to a local venue where the agricultural products may be produced by farmers, fishermen, or ranchers.

The local venue may also include a monitoring system 160 (e.g., network signal receptors, servers, sensors, and/or video cameras). The monitoring system 160 may be able to track (e.g., identify or detect) devices (e.g., vendor devices 120A-120B, buyer devices 130A-130B) within the venue, as the venue may span a geographic area covered by the network 140. While some devices may be identifiable by the monitoring system 160 (e.g., vendor devices 120A-120B, buyer devices 130A-130B) allowing the host server 110 to facilitate inventory management via application 150, other devices that are detected may not necessarily have the application 150. For example, the monitoring system 160 may detect the devices of new prospective buyers coming to the venue to purchase agricultural products. The new prospective buyers may be invited (e.g., via a notification sent to their devices) to join the network 140. For example, a notification and/or link may be sent to the devices of the new buyers enabling the devices to access application 150.

In some embodiments, the monitoring system 160 may be configured to monitor the status of the agricultural products, and send the status information to the one or more vendor devices 120A/B. In such embodiments, notifications may sent to the one or more vendor devices 120A/B if the agricultural products are harvested, butchered, grown, captured, or processed, or the agricultural products are scheduled to be harvested, butchered, grown, captured, or processed soon (e.g., within a predetermined time).

The one or more buyer devices 130A/B may be any type of device including a processor, a smartphone, a cellular phone, a tablet computer, a laptop computer, a workstation, smart-eyewear, smartwatch, smart speaker, etc. The one or more buyer devices 130A/B may include at least one memory device that stores instructions and at least one processor configured to execute the instructions. Execution of the instructions by the processor of the one or more buyer devices 130A/B enables the one or more buyer devices 130A/B to perform the operators described herein.

The one or more buyer devices 130A/B may include an application 150 (e.g., an App) that is specified by at least some of the instructions that are stored in the memory device. The application 150 may operate in connection with the host server 110 and may be configured to display a user interface that provides product information provided by the host server 110 and/or the one or more vendor devices 120A/B. Users (e.g., buyers) of the one or more buyer devices 130A/B may use the application 150 to purchase the agricultural products. The application 150 may connect to one or more APIs at the host server 110 to provide query requests for the agricultural products and return query results. The APIs at the host server 110 may also be configured to enable the application 150 to submit a list of agricultural products and/or enable a purchase of agricultural products selected by the buyers.

In some embodiments, instead of the application 150, a web browser may be used to provide services/functions provided by the application 150. The web browser may be configured to access a website hosted or otherwise provided by the host server 110. In some examples, buyers may use the buyer devices 130A/B to access a website of the host server 110. The web browser on the buyer devices 130A/B may be used to access the website for purchasing/managing the agricultural products.

In some examples, vendors may use the application 150 to add/upload a list of agricultural products for sale or provide inventory management information, for example, through the vendor devices 120A/B. The vendors may use the application 150 to provide product information about the listed agricultural products, including prices, and out-of-stock information, and otherwise manage their inventory of agricultural products.

Figure 2:
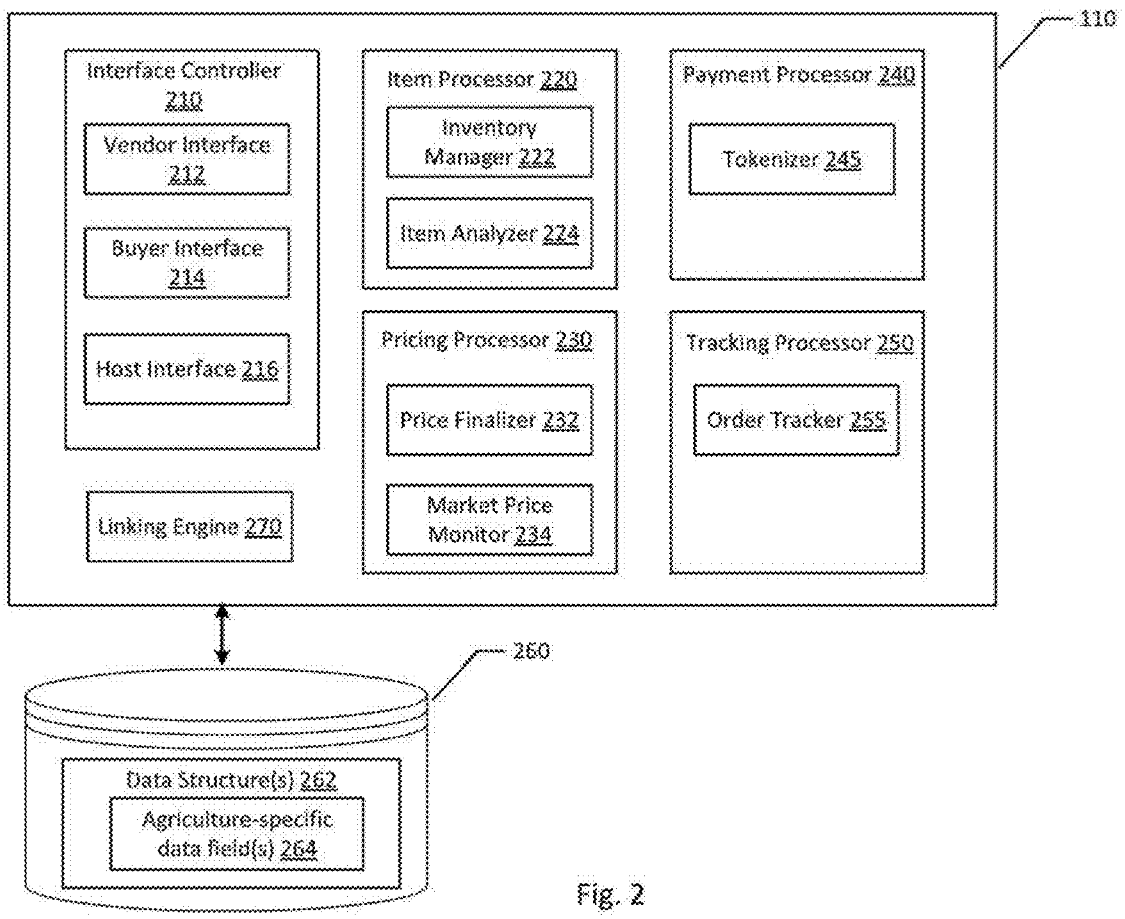
FIG. 2 shows a diagram of the host server of FIG. 1, according to an example embodiment of the present disclosure.

FIG. 2 shows a diagram of the host server 110 of FIG. 1, according to an example embodiment of the present disclosure. FIG. 2 illustrates operational components of the host server 110 including an interface controller 210, an item processor 220, pricing processor 230, payment processor 240, and tracking processor 250. As illustrated in FIG. 2, the host server 110 may be in communication with a memory device 260. In an example, the memory device 260 may be part of the host server 110. In another example, the memory device 260 may be separate from the host server 110. The components 210 to 250 (and 260 if the memory device 260 is part of the host server 110) are representative of hardware and/or software of the host server 110. For instance, one or more instructions may be stored to a memory device (e.g., memory device 260 or any other memory devices) that define operation of the components 210 to 250. Execution of the instructions by a processor of the host server 110 may cause the processor to perform the operations described herein. The instructions may be part of one or more software programs or applications. In some embodiments, at least some of the instructions may be implemented by hardware components, such as an Application Specific Integrated Circuit ("ASIC").

As used herein, a memory device (e.g., memory device 260) may refer to a volatile or non-volatile memory device, such as RAM, ROM, EEPROM, a distributed storage system (e.g., distributed ledgers/blockchain), or any other device capable of storing data. As used herein, a processor may refer to a device capable of executing instructions encoding arithmetic, logical, and/or I/O operations. In one illustrative example, a processor may follow Von Neumann architectural model and may include an arithmetic logic unit ("ALU"), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU"). Processors may be interconnected using a variety of techniques, ranging from a point-to-point processor interconnect, to a system area network, such as an Ethernet-based network. In an example, the one or more processors may be in the host server 110. In an example, all of the disclosed methods and procedures described herein can be implemented by the one or more processors. Further, the host server 110 may be distributed over multiple processors, memories, and networks.

In some embodiments, the memory device 260 may store one or more data structures 262 adapted to facilitate inventory management of variable weighted and variable priced agricultural products. The data structure may relate two or more agriculture-specific data fields 264 together using linkages based on the unique nature of agricultural products. For example, the data structure may relate a plurality of available base unit values and a plurality of available base unit measurement types to each type of agricultural product. Moreover the relations between such data fields that are uniquely intrinsic to agricultural products may be determined using a dynamic linking engine. The dynamic linking engine 270 allows for the formation of new relations based on new developments in agriculture (e.g., new or modified agricultural products, updated base unit measurement types based on the new or modified agricultural products, market demands, etc.).

The example interface controller 210 of FIG. 2 may be configured to provide interactive interfaces for one or more buyer devices 130A/B or one or more vendor devices 120A/B to enable one or more vendors or one or more buyers to display, sell, or buy agricultural products using defined base units. The interface controller 210 may include a vendor interface 212, a buyer interface 214 (e.g., a product purchase interactive interface), and a host interface 216.

The example vendor interface 212 may include one or more APIs for receiving search queries and transmitting data for display in the application 150 or on a website via a web browser. The vendor interface 212 may be configured to enable vendors, via their devices 120A/B, to add/upload information indicative of agricultural products for sale including base unit pricing and inventory information. The vendor interface 212 may be also configured to enable vendors to provide product information of the added/uploaded agricultural products. In some examples, the product information provided by the vendors through the vendor interface may include a product description, a base unit measurement type, a price per base unit, and an estimated range of units for the added/uploaded agricultural products. In some examples, the product information may further include a deposit amount for each of the added/uploaded agricultural products.

The example buyer interface 214 (also referred to herein as product purchase interactive interface) may include one or more APIs for receiving search queries and transmitting data for display in the application 150 or on a website via a web browser. The buyer interface 214 may be configured to provide for the display of agricultural products, or the product information related to the added/uploaded agricultural products. For example, as discussed below in relation to FIG. 4, the buyer interface 214 may include an agricultural product data field 403 comprising one or more fields or subfields that may be populated. The buyer interface 214 may be also configured to receive a purchase order from the application 150 or web browser of the buyer devices 130A/B. The buyer interface 214 may be configured to require the buyer (device) to pay the deposit amount for the ordered agricultural products when making the purchase order. In some aspects, the buyer interface 214 may be configured to receive information about the buyer, such as a buyer type (e.g., wholesale, retail, member, etc.), and allow the host server 110 to adjust prices for agricultural products accordingly.

The example host interface 216 may include one or more APIs for receiving search queries and transmitting data for display in the application 150 or on a website via a web browser. The host interface 216 may be configured to enable a host (e.g., service provider, host server manager, application/website manager), via the host server 110, to manage the system 100 (e.g., provide/upgrade/manage the functions performed by the components of the system 100 described herein).

The item processor 220 may include an inventory manager 222 and an item analyzer 214. The inventory manager 222 may be configured to manage the inventory of the agricultural products added/uploaded by the one or more vendors. The inventory manager 222 may be also configured to manage the product information of the added/uploaded agricultural products. For example, when receiving a request to add/upload agricultural products and related product information from a vendor device 120A/B via a vendor interface, the inventory manager 222 may add/upload the agricultural products to the system (e.g., host server 110, application 150, website), and store the product information in the memory device 260.

The tracking processor 250 may include an order tracker 255. The order tracker 255 may be configured to track each of the purchase orders made by one or more buyers for a target agricultural product. When a buyer makes a purchase order using the buyer device 130A/B via the buyer interface 214 (and pays the deposit amount), the order tracker 255 may generate/receive a deposit message for a target agricultural product. In some examples, the order tracker 255 may generate the deposit message through the application 150 or website. In other examples, the order tracker 255 may receive the deposit message generated by the application 150, website, or buyer/vendor device. The deposit message may include an identification of the target agricultural product, a deposit amount for the target agricultural product, an identifier of the buyer, an identification of the vendor, a base price per unit for the target agricultural product, and an estimated range of units for the target agricultural product. In some examples, the identification of the target agricultural product may include an identification of each purchase order. In some examples, the deposit message may be generated/received at a time before the target agricultural product has been harvested, butchered, grown, or captured. In other examples, the deposit message may be generated/received at a time after the target agricultural product has been harvested, butchered, grown, or captured (but before they are fully processed for sale). The order tracker 255 may store the deposit message in a memory device (e.g., memory device 260).

In some examples, the order tracker 255 may be configured to lock the price per base unit of the target agricultural product in response to receiving the purchase order from the buyer device 130A/B. In some examples, the price per base unit may comprise price per base unit measurement type (e.g., price per weight, price per crate, price per pallet, price per dozen, etc.) as described herein.

In some examples, the order tracker 255 may be configured to generate/receive a fulfillment message for a target agricultural product. The fulfillment message may be indicative that the target agricultural product has been harvested, butchered, grown, captured, or processed, or the target agricultural product would be harvested, butchered, grown, captured, or processed soon (within a predetermined time). In some examples, the order tracker 255 may generate the fulfillment message through the application 150 or website. In other examples, the order tracker 255 may receive the fulfillment message generated by the application 150, website, or vendor device 120A/B. In some examples, the fulfillment message may further include an identification of the target agricultural product, a deposit amount for the target agricultural product, an identifier of the buyer, an identification of the vendor, and/or a price per base unit for the target agricultural product. The order tracker 255 may store the fulfillment message in a memory device (e.g., memory device 260).

In some examples, the fulfillment message may be generated using the deposit message. For example, when receiving the final total unit amount from the vendor device 120A/B, the order tracker may identify the identification of the target agricultural product (e.g., identification of the purchase order for the target agricultural product), load, from the memory device, the deposit message for the target agricultural product using the identified identification of the target agricultural product, and generate the fulfillment message. In other examples, the fulfillment message may only include the final total unit amount information, and the order tracker 255 may generate a separate order tracking message, for example, using the deposit message, as described above. The fulfillment message or the order tracking message may include information about an identification of the target agricultural product, a deposit amount for the target agricultural product, an identifier of the buyer, an identification of the vendor, a base unit for the target agricultural product, a base unit measurement type for the target agricultural product, a price per base unit for the target agricultural product, and/or the total unit amount. The deposit message, fulfillment message, and/or the order tracking message may be used to finalize the purchase order for the target agricultural product, as described in more detail below. In some examples, the order tracking message may comprise the deposit message, fulfillment message, or any other message that is used to track and/or finalize the purchase order for the target agricultural product.

In some examples, the deposit message, fulfillment message, and/or the order tracking message may be created by creating a table for the purchase order for the target agricultural product. This table may be stored in a data structure in a memory device. In other examples, the deposit message, fulfillment message, and/or the order tracking message may be created by creating a multi-dimensional tuple for the purchase order. For example, the deposit message may be generated by creating a multi-dimensional tuple. The multi-dimensional tuple for the deposit message may be associated with the above-discussed information included in the deposit message. For example, a deposit message tuple may be a tuple of {identification of the target agricultural product, deposit amount, identifier of the buyer, identification of the vendor, price per unit, estimated range of units}. In response to receiving an order for the target agricultural product, the deposit message may be generated by creating the multi-dimensional tuple.

Similarly, the fulfillment message or the order tracking message may be generated by creating a multi-dimensional tuple. The multi-dimensional tuple for the fulfillment message or the order tracking message may be associated with the above-discussed information included in the fulfillment message or the order tracking message. For example, a fulfillment message/order tracking message tuple may be a tuple of {identification of the target agricultural product, deposit amount, identifier of the buyer, identification of the vendor, price per unit, total unit amount}.

The payment processor 240 may be configured to process the payment made by a buyer or a buyer device 130A/B. The payment processor 240 may include a tokenizer 245. The tokenizer 245 may be configured to tokenize any (digital) payment made by the buyer or buyer device 130A/B. For example, when a purchase order is made, a deposit amount is paid and a deposit message is generated/received, the tokenizer 245 (for example, in cooperation with the order tracker 255) may create and store to the memory device 260 (e.g., a data structure therein) a transaction token or record including information from the deposit message. The transaction token may correspond to the deposit amount paid for the target agricultural product. The payment processor 240 may be configured to cause the deposit amount to be transferred from an account of the buyer to an account of the vendor, for example, by tracking the purchase order using the deposit message.

The pricing processor 230 may include a price finalizer 232 and a market price monitor 234. The price finalizer 232 may be configured to finalize the purchase order for the target agricultural product. For example, the price finalizer 232 may be configured to compute a total amount owed by the buyer. In some examples, the price finalizer 232 may compute the total amount owed by accessing the transaction token or transaction record, and multiplying the price per base unit of the target agricultural product by the total unit amount and subtracting the deposit amount. As used herein, the transaction record may refer to any record (e.g., deposit message, final message, order tracking message) related to the purchase order for the target agricultural product.

In other examples, the price finalizer 232 may compute the total amount owed by subtracting the deposit amount from a final total price. The final total price may be computed by multiplying the price per unit of the target agricultural product by the total unit amount, or inputted from the vendor device 120A/B.

Once the total amount owed by the buyer is computed, the payment processor 240 may transmit a transaction completion message to the buyer device. The transaction completion message may be indicative of the total amount owed. The payment processor 240 may receive a final payment message from the buyer device for the total amount. Then, the payment processor 240 may cause the total amount to be transferred from an account of the buyer to an account of the vendor. Then, the inventory manager 222 may cause the total unit amount of the target agricultural product to be provided to the buyer. For example, the inventory manager 222 may create a delivery message to the vendor device 120A/B. The delivery message may include information about the shipping deadline, buyer name, and/or destination address. Once the target agricultural product is delivered, the inventory manager 222 may record the order status of the target agricultural product as fulfilled in the memory device 260. Then, the inventory manager 222 may cause the desired number of units to be provided to the buyer.

The market price monitor 234 of the pricing processor 230 may be configured to monitor a market price for the agricultural products. For example, the market price may be a price inputted by a plurality of vendors using the application 150/website provided by the host server 110. The market price information for the agricultural products may be analyzed for a predetermined period of time (3 days, 1 week, 1 month, 3 months, 1 year, etc.). Based on the analyzed market price information, the market price monitor 234 may provide a recommended range of price per base unit (and/or measurement unit type) for the agricultural products. This recommended range of price per base unit may be provided to the vendor device 120A/B when the vendors are adding/uploading the agricultural products to provide a guidance to the vendors for the general market trend for the price per unit of the agricultural products. The recommended range of price per base unit may be in the form of maximum/minimum price per unit, average price per unit, or median price per unit, or in any other suitable form.

The memory device 260 may include a database or other data structure that stores the product information provided by the vendor device 120A/B, or any other information related to the agricultural products, purchase orders (date, time, etc.), vendors, and/or buyers. As described above, the product information may include a product description, product type, available base unit values and available base unit measurement types attributable to the product type, price per base unit of the agricultural products, price adjustments per buyer type, inventory replenishment information, inventory carryover information, and/or an estimated range of units for the variable weighted and variable priced agricultural products. In an example, the data structure of the memory device 260 may include a table that shows the transactions in the system. The table may include information about the item (agricultural products), buyers, vendors, transaction date, deposit amount, prices, and/or base units. The table may include any additional information related to the agricultural products and purchase orders (e.g., price per unit, final total unit amount, final total price, total amount owed, monitored market price, recommend price per unit, estimated harvesting/butchering date, location of the vendor device/buyer device, etc.). In some examples, the table may be managed for each vendor (e.g., a first table for vendor 1, a second table for vendor 2, . . . , and an nth table for vendor n). In other examples, the table may be managed in any other suitable form.

Base Unit Management Embodiment

Figure 3A:
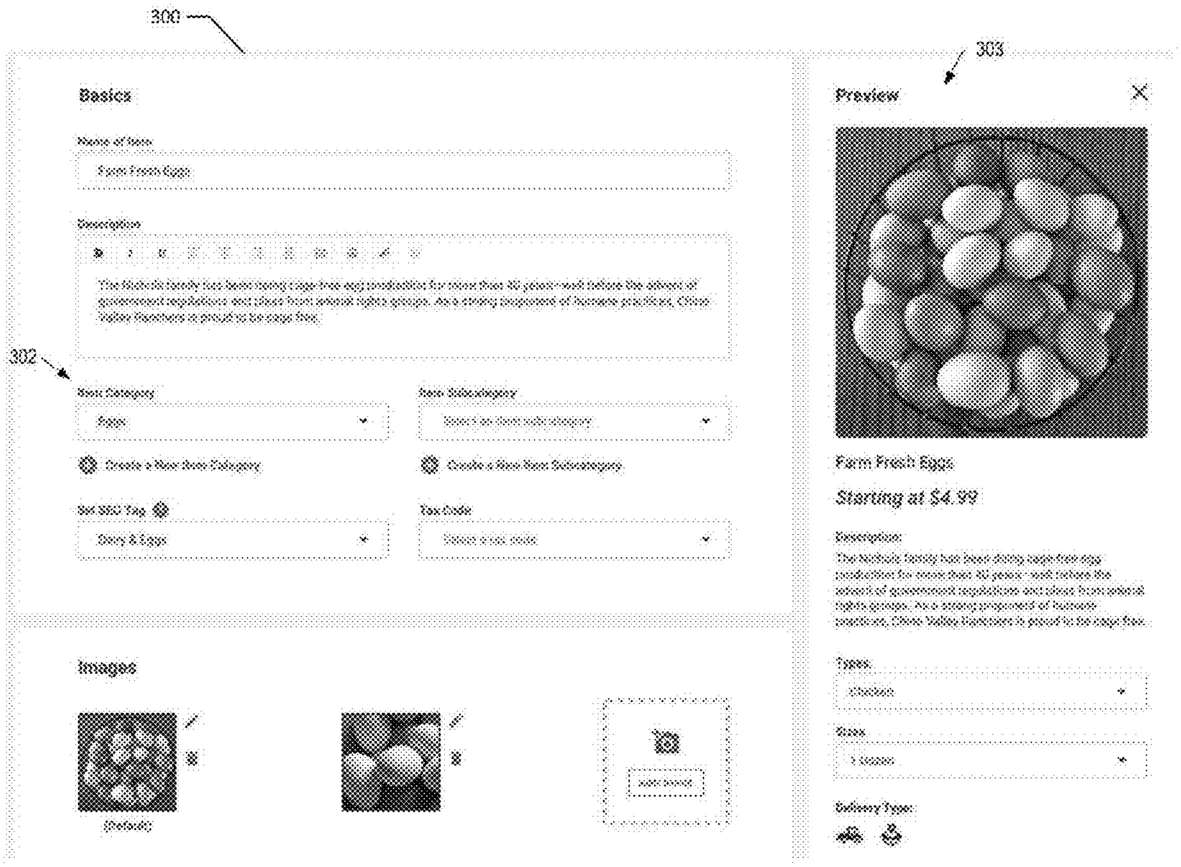
FIGS. 3A and 3B show diagrams of an interactive interface that may be displayed to a vendor to set a price for a base unit of an agricultural product, according to an example embodiment of the present disclosure.
Figure 3B:
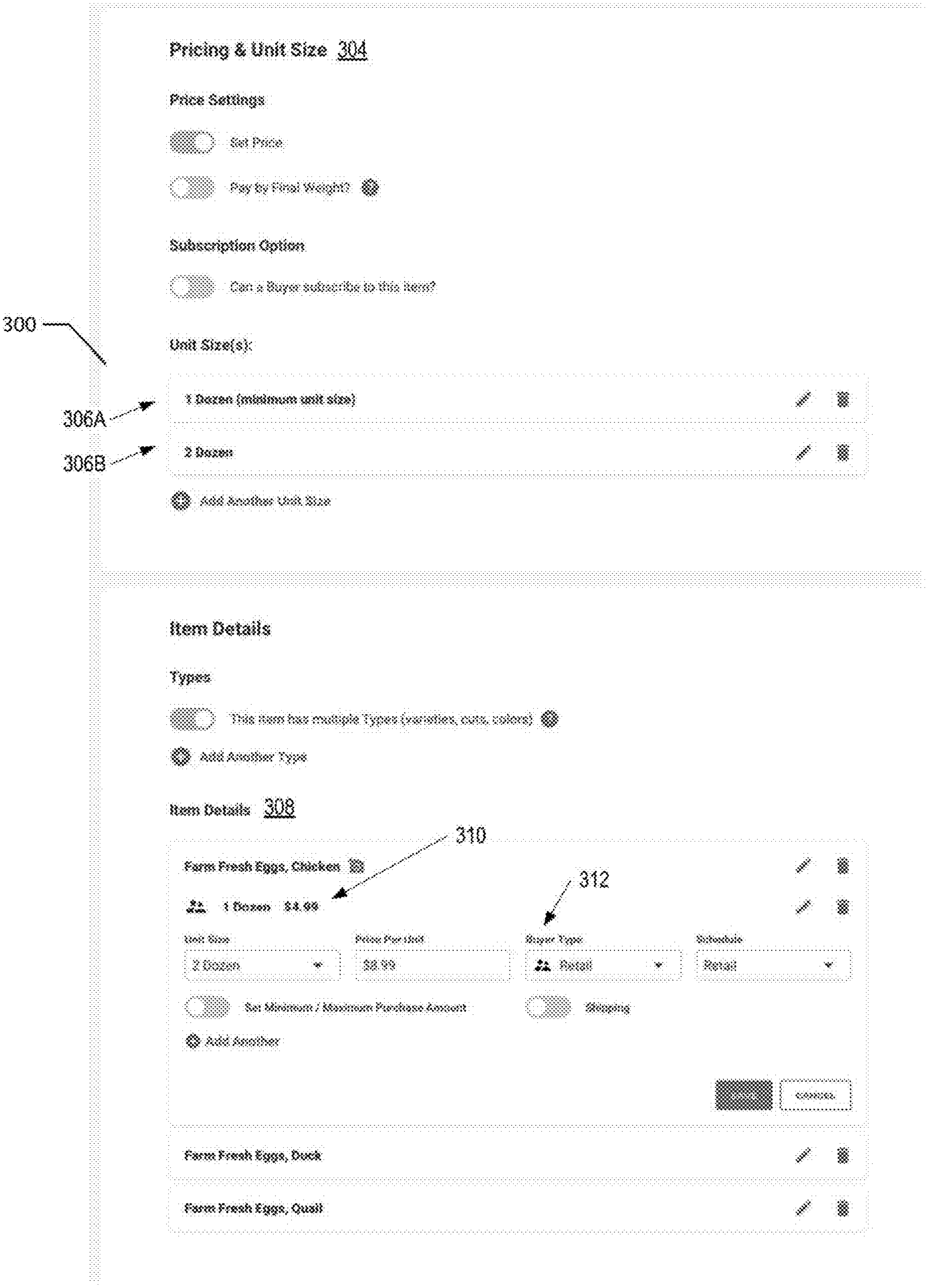

FIGS. 3A and 3B show diagrams of an interactive interface 300 that may be displayed to a vendor to set a price for a base unit of an agricultural product, according to an example embodiment of the present disclosure. In this embodiment, a memory device stores a data structure that relates a plurality of available base unit values and a plurality of available base unit measurement types to each type of agricultural product type. An interface controller provides the interactive interface 300 for a vendor. The interactive interface 300 includes an agricultural product type field (e.g., item category 302), a base unit values field (e.g., "1 dozen" 306A and "2 dozen" 306B, under "pricing and unit size" 304 on FIG. 3B), and a base unit measurement type field (pricing and unit size 304 on FIG. 3B). The interactive interface 300 also enables the vendor to select a nominal unit price 310 for a base unit.

In some embodiments, selection of an agricultural product type causes the processor to determine base unit values and base unit measurement types that are applicable for the product. The processor causes the interactive interface 300 to show (via a drop down menu) the available base unit values selectable from the base unit values field and the plurality of available base unit measurement types selectable from the base unit measurement type field. As shown in FIGS. 3A and 3B, a vendor selects a base unit value (e.g., 1 dozen) and a measurement type (e.g., eggs (unit product)). The interactive interface 300 also enables the vendor to create multiples of the base unit with separate pricing (e.g., Item Details 308 on FIG. 3B). A vendor can specify different pricing for multiples of the base unit. Once the selections are complete, the interactive interface stores to a marketplace record on the memory device a record of selected agricultural product type, the selected base unit value, the selected base unit measurement type, multiples, and/or related pricing. As shown in FIG. 3A, the interactive interface 300 may also include a preview screen 303 that shows how the marketplace record will populate a product purchase interface to enable a buyer to purchase the agricultural product type in one or more increments of the base unit value at the base unit measurement type.

In another example, a vendor may specify a base unit as a quarter (or other fraction) of a steer. A half steer is equal to two base units and a whole steer is equal to four base units. The use of base units makes inventory management easier since steers vary in weight and size greatly. This means that inventory by weight may not accurately reflect the current inventory. The definition of fixed base units accordingly enables effective inventory management while providing fixed discrete units for purchase that can be subtracted directly from inventory instead of needing manual adjustments by the vendor. In other examples, base units may be defined for other agricultural products including milk, syrup, honey, produce, etc.

In some embodiments, the interactive interface 300 includes fields to enable price adjustments based on a buyer type. Buyer types may include, but are not limited to, e.g., a wholesaler (e.g. a distributors, Co-Ops, grocers, schools, hospitals, restaurants, etc.), a retailer, a guest, a frequent buyer, or a membership buyer. The interface 300 may show a nominal base unit price 310 for a guest buyer. The interface 300 may include options for adding different buyer types 312 (e.g., wholesale, retail, member, etc.) and according price adjustment amounts. The price adjustments may be defined as a percentage increase or decrease from the nominal base unit price. Alternatively, a vender may enter a separate base unit price for each buyer type. This information is also stored to the marketplace record and populated based on detection of a buyer type (using buyer login information).

Figure 4:
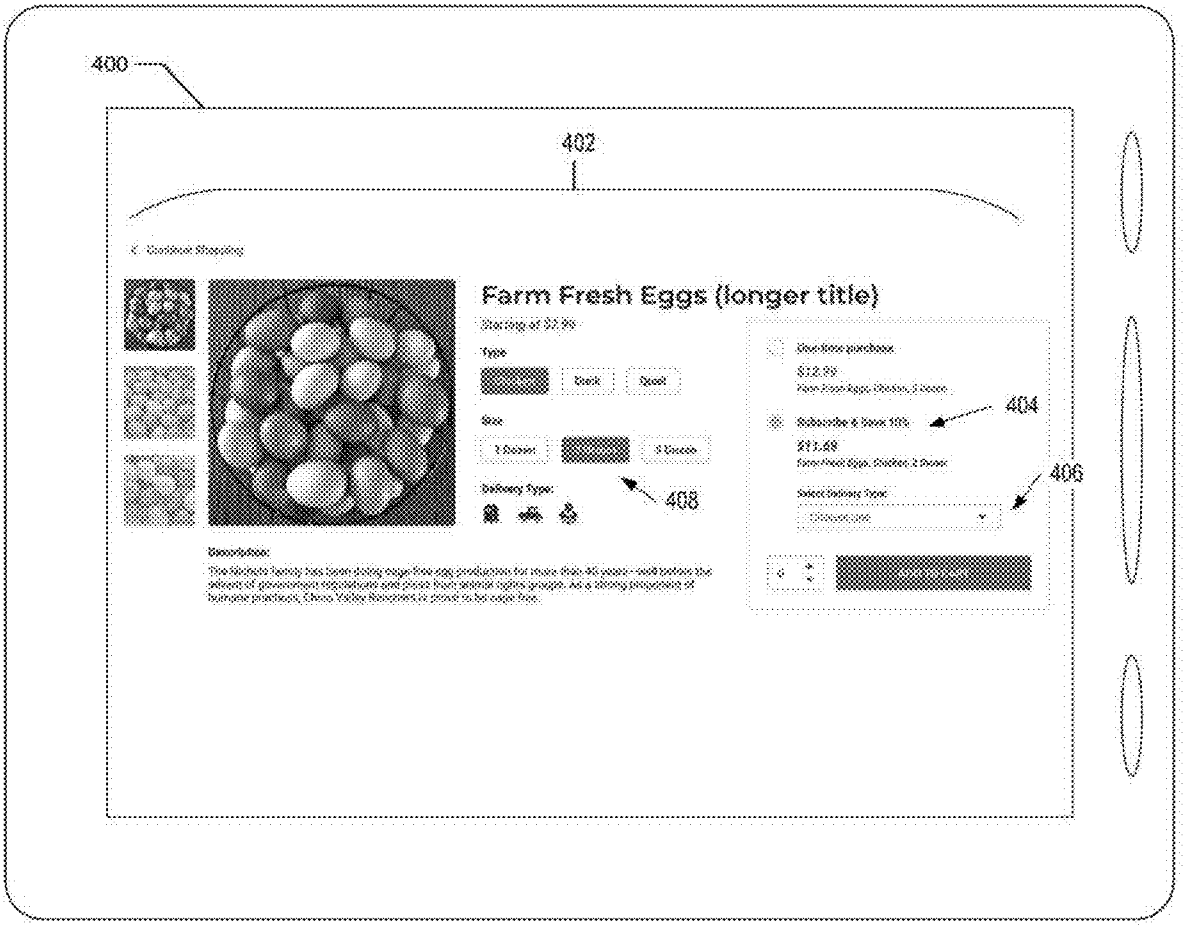
FIG. 4 is a diagram of an interactive interface for a buyer, according to an example embodiment of the present disclosure.

FIG. 4 is a diagram of an interactive interface 400 for a buyer, according to an example embodiment of the present disclosure. The interactive interface 400 uses a marketplace record to populate a template (e.g., an agricultural product field 402 comprising many subfields) with the base unit information including the base unit multiples and corresponding pricing.

As shown in FIG. 4, the example processor of the host server may also enable products to have unique sales offerings and logistics. This can include ongoing subscriptions (e.g., "Subscribe & Save 10%" 404), time-boxed subscriptions (for a specific time frame including a start and end date), unique fulfillment schedules 406 (shipping, delivery and/or pickup), and/or variable unit sizes 408. Further, the processor may provide for the purchase of other items in the same ecommerce experience to account for cross-selling and accurate deprecation of stock. For example, item A is sold as an Item but is also placed in a 'mixed box' of items that includes item A and other items. In another example, an item might simply be ribeye steaks with one inventory. An item could also be 'steaks' and group similar items (ribeye, New York, filet mignon), each a unique inventory. In either case, items can each have unique offerings.

Inventory Management Embodiment

Figure 5:
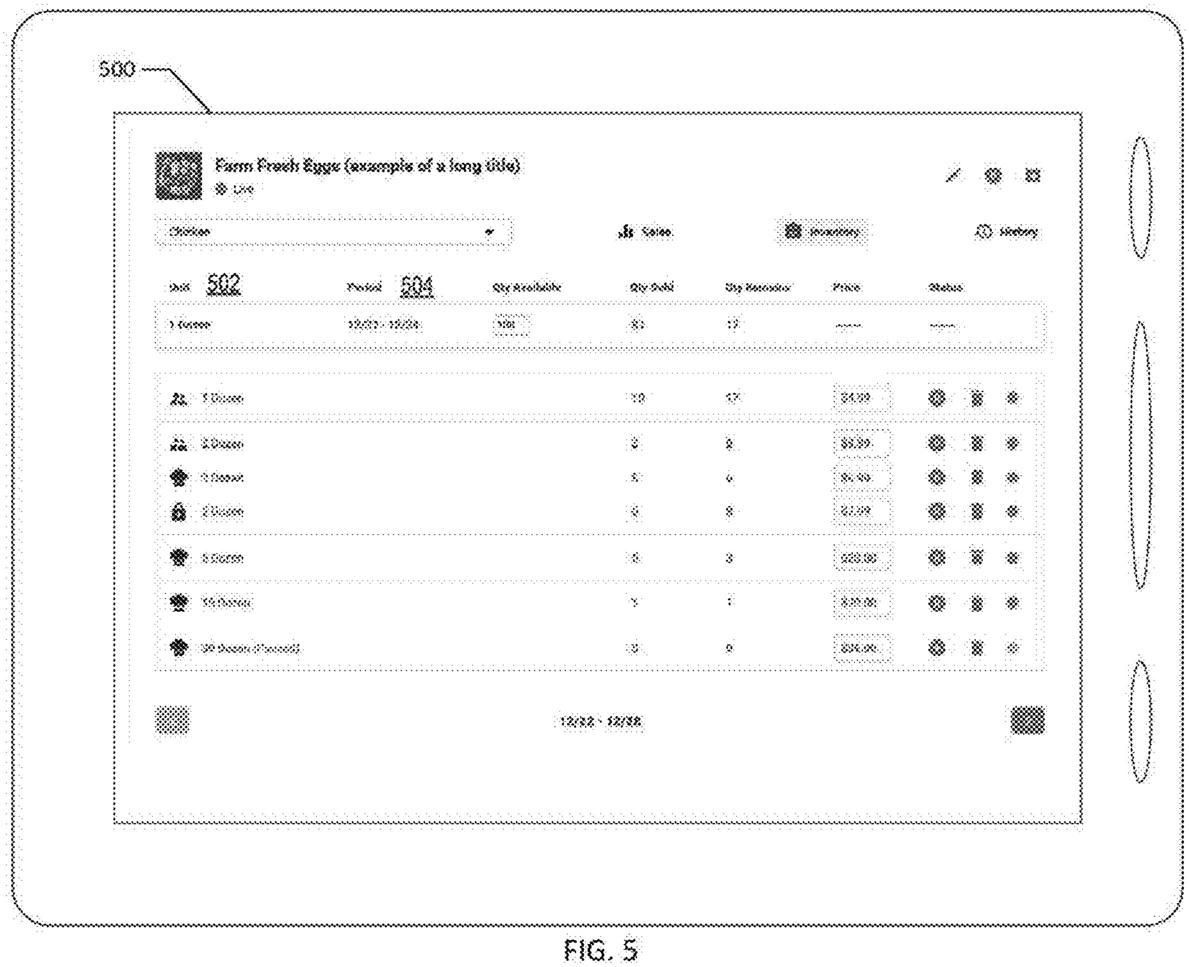
FIGS. 5 and 6 are diagrams of inventory management interactive interfaces, according to an example embodiment of the present disclosure.
Figure 6:
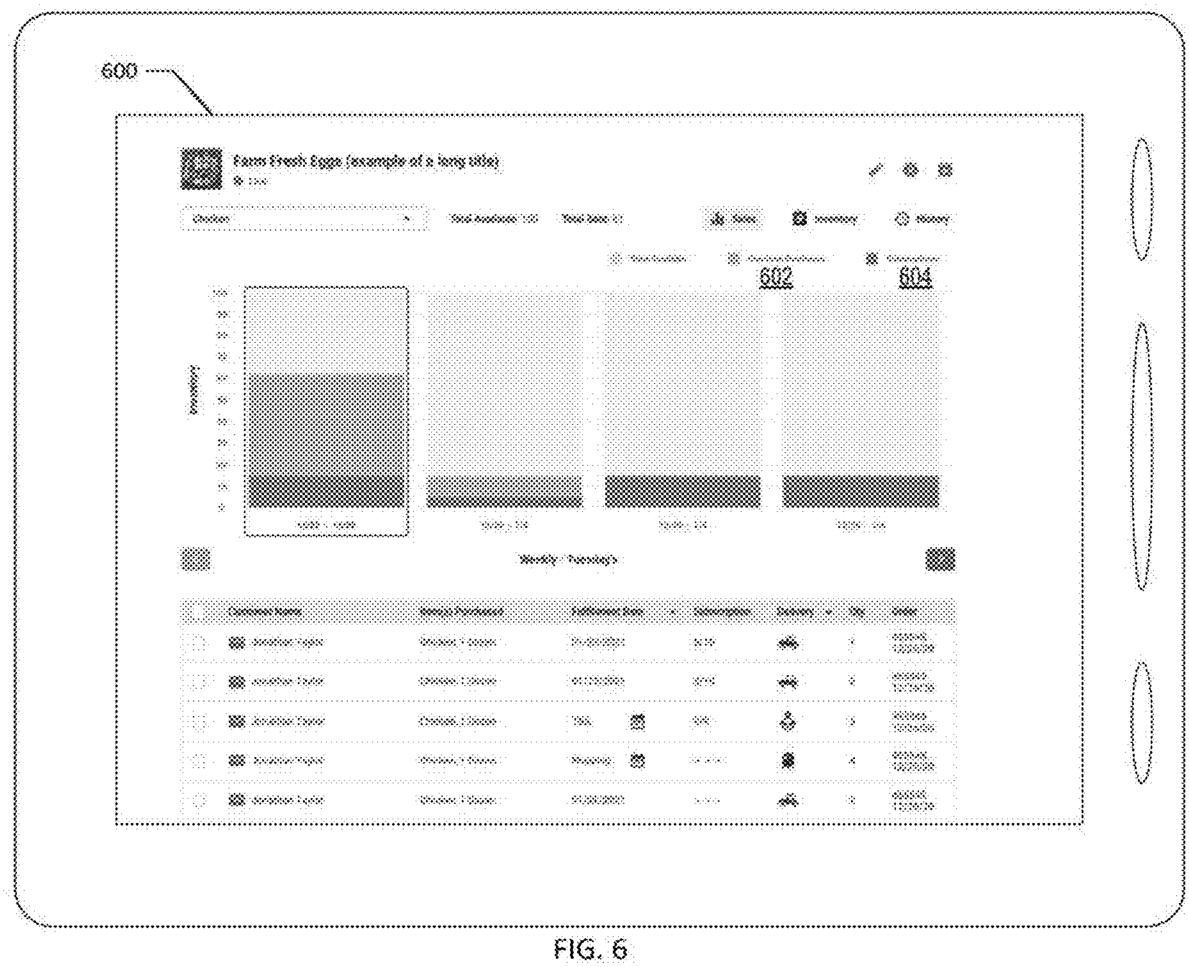

FIGS. 5 and 6 are diagrams of inventory management interactive interfaces 500 and 600, according to an example embodiment of the present disclosure. As shown in FIG. 5, inventory stock of agricultural products are defined in terms of the base unit 502 for that product. Further, the processor enables the vendor to define tracking time periods 504. This enables vendors to accurately account for sales and actual inventory stock for specific time periods, including the ability to sell for any period (not just the 'next' period).

Further, inventory can be optionally purchased for different time periods and tracked. Examples of time periods include but are not limited to daily, weekly, monthly. Items are associated with time of purchase as well as time of fulfillment. Time of fulfillment enables accurate inventory tracking. Inventory can be viewed based on designated time and date of fulfillment, including items purchased one-time 602 or as part of a subscription 604, as shown in FIG. 6.

The inventory manager capabilities of the processor enables the vendor to elect to manage inventory manually or automatically. Manual inventory management is real-time deprecation as items are sold and does not deprecate for multiple (or N+) time periods. Inventory availability or amount for sale can be manually adjusted/changed at any time. The manual management of inventory shows what number is for purchase in real-time, and can show sales history as well as status of pending orders/unfulfilled items.

The example processor also provides for automated inventory management. Automated inventory management enables the vendor to set rules to automatically replenish the amount of inventory available per assigned/custom time period(s). Vendors can set an amount to replenish per time period, including carryover items from prior period(s) and a ceiling or maximum amount to show per period (carryover not to exceed a certain amount). This is ideal for items with an expiration date that may carryover for a few periods but then need to be counted as 'lost' or 'gone bad' (perishable). Vendors can manually override the amount of inventory available per time period(s) at any time.

In the illustrated example, a vendor can set chicken eggs to have two carry over periods, which corresponds to two weeks. Thus, inventory added during the 12/22-12/28 period that remains unsold is carried over to the inventory for the 12/29-1/4 period, and if still unsold, carried over to the 1/5-1/12 period. After that, any remaining eggs are not carried over to the next period. Further, the vendor can estimate an amount of inventory added per period such that inventory is automatically replenished. For example, a vendor may determine that every week 100 eggs are produced. As a result, the processor adds 100 eggs to inventory every week, can automatically carries over unsold inventory that does not exceed a carryover limit to provide an accurate inventory for buyers. Accordingly, the processor provides automated inventory management of agricultural products, which are unique from manufactured goods due to perishability and the uneven schedules in which the products are produced.

Figure 7:
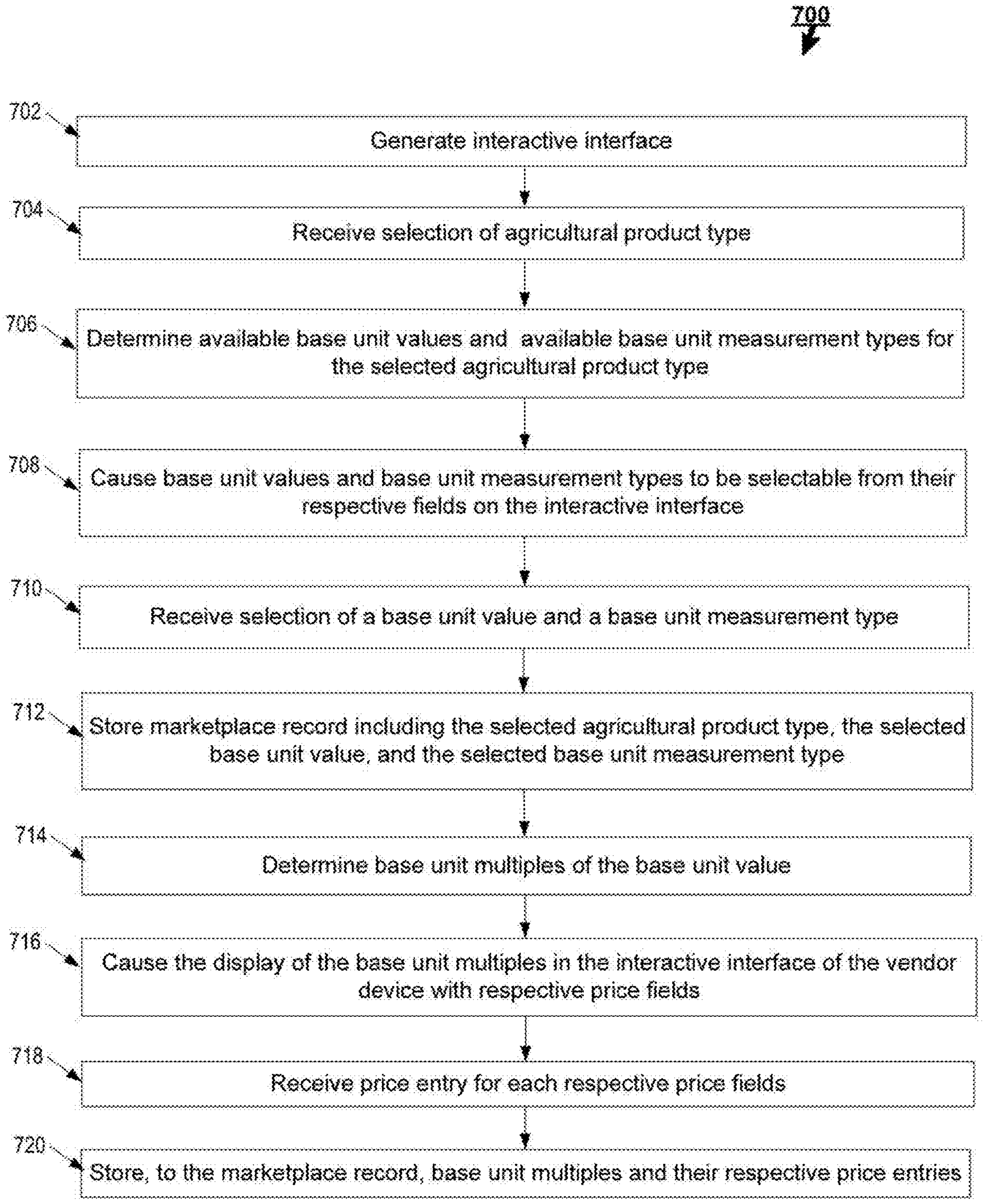
FIGS. 7 and 8 are flow charts showing example processes performed by a host server for inventory management for variable weighted and variable weighted agricultural products, according to an example embodiment of the present disclosure.
Figure 8:
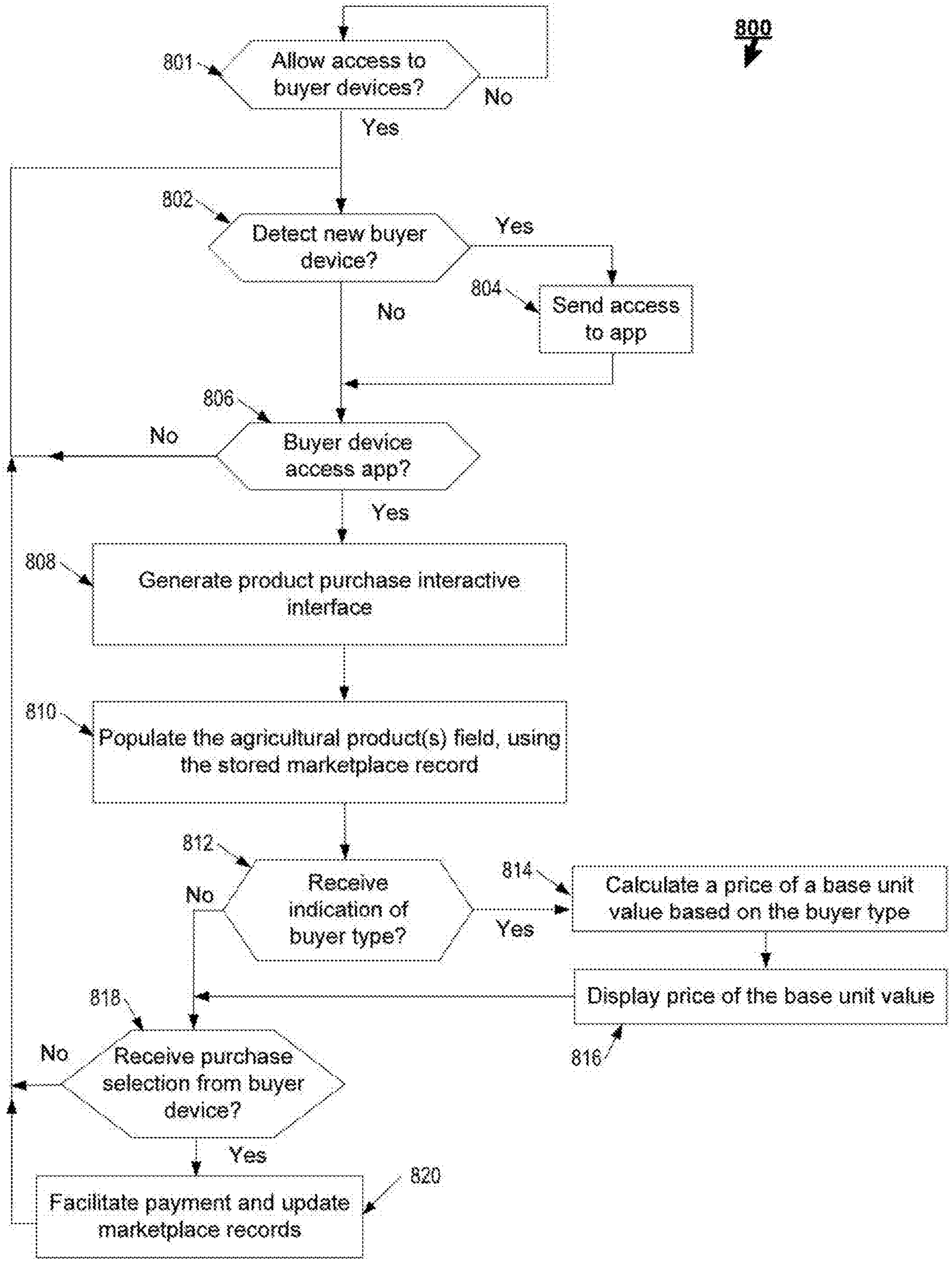

FIGS. 7 and 8 are flow charts showing example processes performed by a host server for inventory management for variable weighted and variable priced agricultural products, according to an example embodiment of the present disclosure. Specifically, FIG. 7 shows an example process 700 performed by a host server (e.g., host server 110 of FIGS. 1 and 2), to enable a vendor device (e.g., vendor device 120A, vendor device 120B, etc.) to manage the inventory of agricultural products, and FIG. 8 shows an example process 800 performed by the host server to receive information from, and enable purchasing capabilities to, a buyer device (e.g., buyer device 130A, buyer device 130B, etc.) for variable weighted and variable priced agricultural products.

Referring to FIG. 7, process 700 may begin with the host server generating, on the vendor device, an interactive interface (block 702). For example, the interface controller 210 of the host server 100 may generate, via application 150 on the vendor device 130A/B, the interactive interface. As discussed above, and shown by way of an example in FIGS. 3A-3B, this interactive interface may provide a variety of data fields to allow a vendor to manage inventory of variable weighted and variable priced agricultural products. One such data field may include various agricultural product types (e.g., animal product types (e.g., poultry, large animals, fish, crustaceans, etc.), vegetables, fruits, nuts, beans, dairy, horticulture, etc.)

At block 704, the host server may receive a selection of an agricultural product type. For example, a vendor, seeking to enter inventory information for a recently harvested agricultural product, may select, from among a variety of agricultural product type options presented on the interactive interface, the agricultural product type pertaining to the agricultural product.

The host server may then determine available base unit values and available base unit measurement types for the selected agricultural product type (block 706). Furthermore, the host server may cause those base unit values and base unit measurement types to be selectable from their respective fields on the interactive interface (block 708). For example, based on a vendor selecting chicken eggs as the agricultural product type for recently harvested cage-free chicken eggs, the host server may determine that the base unit measurement type associated with chicken eggs are in a number of eggs (e.g., as it may be impractical to sell half of an egg). As previously discussed, the base unit value may constitute the smallest unit that is available for purchase and is specified in a measurement unit that is typical for the agricultural product being offered for sale. Thus, a vendor may choose to designate a dozen as the smallest unit that is available for purchase, and such unit may be specified as twelve eggs, as an egg is a base unit measurement type. In some aspects, the item analyzer 224 of the host server 110 may look up the selected agricultural product type in the memory device 260 and retrieve available base unit values and base unit measurement types associated with the selected agricultural product type. Such associations may be dynamically formed, replaced, updated, or deleted, e.g., via linking engine 270.

The vendor may then choose to select a base unit value (e.g., one dozen) and a base unit measurement type (e.g., eggs) for the agricultural product (e.g., cage-free chicken eggs), e.g., to enter inventory details and set prices for the agricultural products. The selection may be performed via the interactive interface generated by the host server 110 on the application 150 on the vendor device 130A/B. At block 710, the host server may thus receive the selection of the base unit value and the base unit measurement type.

The host server may then store a marketplace record including the selected agricultural product type, the selected base unit value, and the selected base unit measurement type (block 712). The marketplace record may comprise a data structure 262 of memory 260 that may be associated with a specific vendor and/or venue, and may be easily retrieved and/or updated. For example, the marketplace record may be used to display inventory information to a prospective buyer via a product purchase interactive interface on their buyer device, as will be discussed below in relation to FIG. 8.

In some aspects, the host server may determine base unit multiples of the base unit value (block 714). For example, for a given base unit value selected by the vendor (e.g., 1 dozen), the host service may calculate available base unit multiples that may be possible, e.g., based on the available stock of the base unit measurement type (e.g., available eggs). For example, if a vendor has only 108 eggs in the inventory, and has selected a base unit value of a dozen (e.g., 12 eggs), then the host server may determine base unit multiples of one through nine, as nine dozens would comprise the entire stock of available eggs, and anything more than nine dozens may be impossible to obtain. Also or alternatively, the host server may assign a predetermined range of base unit multiples (e.g., one to three) for a base unit value, or may assign base unit multiples based on foreseeable availability (e.g., as determined by information provided by a vendor).

At block 716, the host server may cause the display of the base unit multiples on the interactive interface of the vendor device with respective price fields. The interactive interface may prompt the buyer, or allow the vendor the option, to enter prices for the respective price fields of one or more base unit multiples. For example, although a vendor may set a base unit price for a base unit of the agricultural product (e.g., $10 for one dozen of eggs), the vendor may choose to set a price for a base unit multiple (e.g., $25 for three dozens of eggs) that is different from the base unit price times the multiple (i.e., different from $30 for three dozens of eggs). The vendor may be inclined to enter adjusted prices for different base unit multiples, for example, to encourage wholesale purchase of agricultural products, e.g., to minimize unsold agricultural products and wastes. Thus, the vendor may enter prices for the respective price fields. Also or alternatively, the vendor may choose to just enter the price for the base unit.

At block 718, the host server may thus receive the price entries for the respective price fields from the vendor device. At block 720, the one or more base unit multiples and their respective price entries may be stored to the marketplace record. Also or alternatively, if the vendor chooses to only enter a price for the base unit, the host server may populate the price fields of the respective base unit multiples by calculating a respective multiple of the base unit price. In some embodiments, the host server may dynamically calculate a base unit price based on external data. For example, pricing processor 230 may use market price monitor 234 to retrieve a market price for the agricultural product based on the selected base unit value.

As discussed above, FIG. 8 shows an example process 800 performed by the host server to manage inventory of agricultural products by receiving information from, and enable purchasing capabilities to, a buyer device (e.g., buyer device 130A, buyer device 130B, etc.).

Referring to FIG. 8, process 800 may begin after the host server has determined that the vendor device has enabled prospective buyers to access and/or purchase the inventory of agricultural products (block 801). In some aspects, the host server may be prevented from providing access to buyer devices if, for example, the vendor does not feel ready to present its inventory to buyers yet. Assuming the vendor has toggled "on" the option for buyers to purchase inventory (e.g., block 801: Yes), process 800 may proceed with the host server iteratively monitoring to detect and/or identify prospective buyer devices. For example, the host server may determine whether a new buyer device has been detected (block 802). In one aspect, monitoring system 160 may determine the presence of a buyer device via signals transmitted by a device having an unidentified device ID within the network 140. If a new buyer device is detected, the host server may send the device an access to an application (e.g., application 150 to allow the prospective buyer to purchase agricultural products). For example, the unidentified device may receive an invitation to join the network 140, and/or may receive a link to open and/or download the application. In some aspects, the host server may record the device ID of the previously unidentified device once the application has been accessed, and the previously unidentified device may be deemed as an identified buyer device.

In some embodiments, for example, in venues that are virtual marketplaces, a host server need not monitor to see if a new buyer device has been detected, and may proceed to block 806. The host server may establish communications with a given buyer device after the application 150 is accessed, and may perform one or more steps of blocks 806 through 820 for the given buyer.

At block 806, the host server may determine if a buyer device has accessed the application. For example, the buyer device may be a known buyer device or a device that has now been identified after block 804. In some aspects, the accessing of the application may cause the buyer device to send a request to the host server to engage the buyer via an interactive interface (product purchase interactive interface). The host service may repeat blocks 802 and 804 if no buyer device has been detected and/or if a buyer device has not accessed the application.

At block 808, the host server may thus generate the product purchase interactive interface. As previously discussed in relation to an example illustrated in FIG. 4, the product purchase interactive interface may comprise one or more agricultural product data fields corresponding to one or more agriculture products offered for sale, promoted, or otherwise marketed by the vendor. An agricultural product field may comprise a plurality of fields and subfields, such as a product name, a product description, a product type, a base unit value, delivery options, purchasing options, promotions, etc.

At block 810, the host server may populate the agricultural product(s) field, using the stored marketplace record. For example, based on information provided by the vendor device via process 700, the host server may populate the agricultural product field of each agricultural product using the entered information pertaining to, for example, the product name, the product description, the product type, the base unit value, the delivery options, the purchasing options, the promotions (if any), etc.

As previously discussed, the vendor may have the option to set different prices for agricultural products based on the buyer type. Therefore, in some embodiments, the host server may request and receive information about the buyer type of the buyer associated with the buyer device (block 812). Buyer types may include, but are not limited to, e.g., a wholesaler (e.g. a distributors, Co-Ops, grocers, schools, hospitals, restaurants, etc.), a retailer, a guest, a frequent buyer, or a membership buyer. If an indication of a buyer type is received, the host server may calculate a price of a base unit value based on the buyer type (block 814), and may cause display of the price of the base unit value on the product purchase interactive interface (block 816). For example, a vendor may have decided, and indicated via the interactive interface on their vendor device 130A/B, to markup a price 10% lower for a wholesale buyer as compared to a retail buyer. If the host server were to receive an indication that the buyer associated with the buyer device is a wholesale buyer, the host server may calculate a price of the base unit value that is 10% lower and cause the product purchase interactive interface to display the modified price accordingly.

At block 818, the host server may determine whether it has received a purchase selection from the buyer device for any of the agricultural products offered for sale by the vendor. For example, a buyer may choose to purchase an agricultural product at a desired quantity and delivery option, and indicate a purchase selection accordingly via application 150. If so, the host server may facilitate payment and update marketplace records (block 820). For example, the host server may facilitate the exchange of resources, or cause a third party payment transactions services provider information about the vendor and buyer to facilitate the payment transactions. After a vendor has confirmed a change of status in the agricultural product that the buyer selected for purchase (e.g., the agricultural product has been sold, delivered, or otherwise eliminated from an inventory), the host server may update the marketplace records accordingly.

CONCLUSION

It will be appreciated that each of the systems, structures, methods and procedures described herein may be implemented using one or more computer program or component. These programs and components may be provided as a series of computer instructions on any conventional computer-readable medium, including random access memory ("RAM"), read only memory ("ROM"), flash memory, magnetic or optical disks, optical memory, or other storage media, and combinations and derivatives thereof. The instructions may be configured to be executed by a processor, which when executing the series of computer instructions performs or facilitates the performance of all or part of the disclosed methods and procedures.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims. Moreover, consistent with current U.S. law, it should be appreciated that 35 U.S.C. 112(f) or pre-AIA 35 U.S.C. 112, paragraph 6 is not intended to be invoked unless the terms "means" or "step" are explicitly recited in the claims. Accordingly, the claims are not meant to be limited to the corresponding structure, material, or actions described in the specification or equivalents thereof.

The invention is claimed as follows:

1. An apparatus comprising:

a memory device storing a data structure that relates a plurality of available base unit values and a plurality of available base unit measurement types to each type of agricultural product type;

an interface controller configured to provide an interactive interface for a vendor, the interactive interface including an agricultural product type field, a base unit values field, and a base unit measurement type field; and a processor in communication with the interface controller and the memory device, wherein the processor in cooperation with the interface controller is configured to:

receive, from a vendor device, a selection of an agricultural product type in the agricultural product type field of the interactive interface;

determine the plurality of available base unit values and the plurality of available base unit measurement types for the selected agricultural product type, the determined plurality of available base unit values corresponding to smallest units that are offered for purchase for a base unit measurement type;

cause the plurality of available base unit values to be selectable from the base unit values field and the plurality of available base unit measurement types to be selectable from the base unit measurement type field of the interactive interface;

receive, from the vendor device, a selection of a base unit value and a base unit measurement type;

create a product purchase interactive interface using the selected agricultural product type, the selected base unit value, and the selected base unit measurement type to enable a buyer to purchase the agricultural product type in one or more increments of the base unit value at the base unit measurement type; and for each transaction using the product purchase interactive interface, create a transaction token to tokenize a digital payment for the respective transaction, the transaction token including at least identification of the selected agricultural product type, the selected base unit value, the selected base unit measurement type, and a deposit amount.

2. The apparatus of claim 1, wherein the processor in cooperation with the interface controller is configured to:

after receiving the selection of the base unit value, determine base unit multiples of the base unit value;

cause the base unit multiples to be displayed in the interactive interface with respective price fields;

receive, from the vendor device, a price entry for each of the respective price fields; and add the base unit multiples and the respective price entries to the product purchase interactive interface.

3. The apparatus of claim 1, wherein the processor is configured to create a marketplace record for the product purchase interactive interface that includes the selected agricultural product type, the selected base unit value, and the selected base unit measurement type.

4. The apparatus of claim 1, wherein the memory device stores a plurality of available buyer types and the base unit is associated with a normal price, and wherein the processor in cooperation with the interface controller is configured to:

cause the plurality of available buyer types to be displayed in the interactive interface with respective price change fields for the base unit value with respect to the normal price;

receive, from the vendor device, a price change entry for each of the respective price change fields; and add the buyer types and the respective price change entry to the product purchase interactive interface.

5. The apparatus of claim 4, wherein the processor in cooperation with the interface controller is configured to:

receive an indication of a buyer type of the buyer;

calculate a price of the base unit value based on the indication of the buyer type and the respective price change entry; and cause the product purchase interactive interface to display the calculated price of the base unit value based on the buyer type.

6. The apparatus of claim 4, wherein the buyer types include at least one of a wholesaler, a retailer, a guest, a frequent buyer, or a membership buyer.

7. The apparatus of claim 4, wherein the price change entry includes at least one of a percentage increase from the normal price of the base unit, a percentage decrease from the normal price of the base unit, or a different value to replace the normal price of the base unit.

8. The apparatus of claim 4, wherein the base unit measurement types include at least one of ounces, pints, quarts, gallons, bushels, baskets, pounds, or a fraction of an animal.

9. The apparatus of claim 1, wherein the processor in cooperation with the interface controller is configured to:

cause the interactive interface to display a replenishment quantity field and a time period field;

receive, from the vendor device, a selection of a time period duration and a replenishment quantity; and store to a marketplace record the time period duration and the replenishment quantity.

10. The apparatus of claim 9, wherein the processor is configured to adjust an available inventory of the agricultural product type for purchase such that the available inventory is increased by the replenishment quantity every time period duration.

11. The apparatus of claim 10, wherein the processor in cooperation with the interface controller is configured to:

cause the interactive interface to display a flag indicative as to whether the agricultural product type is perishable;

responsive to selection of the flag, display in the interactive interface a carryover limit field;

receive, from the vendor device, a selection of a carryover limit; and store to the marketplace record the carryover limit.

12. The apparatus of claim 11, wherein the processor is configured to adjust the inventory of the agricultural product type such that at least a portion of the inventory from a previous time period is carried over to a current time period based on the carryover limit.

13. A method of inventory management for agricultural products, the method comprising:

generating, by a server having a processor, on a vendor device, an interactive interface for inventory management, wherein the interactive interface includes an agricultural product type field, a base unit values field, and a base unit measurement type field;

receiving, from the vendor device via the interactive interface, a selection of an agricultural product type in the agricultural product type field of the interactive interface;

determining a plurality of available base unit values and a plurality of available base unit measurement types for the selected agricultural product type, the determined plurality of available base unit values corresponding to smallest units that are offered for purchase for a base unit measurement type;

causing the plurality of available base unit values to be selectable from the base unit values field and the plurality of available base unit measurement types to be selectable from the base unit measurement type field of the interactive interface;

receiving, from the vendor device, a selection of a base unit value and a base unit measurement type;

creating, via the server, a product purchase interactive interface using the selected agricultural product type, the selected base unit value, and the selected base unit measurement type to enable a buyer to purchase the agricultural product type in one or more increments of the base unit value at the base unit measurement type; and for each transaction using the product purchase interactive interface, creating, via the server, a transaction token to tokenize a digital payment for the respective transaction, the transaction token including at least identification of the selected agricultural product type, the selected base unit value, the selected base unit measurement type, and a deposit amount.

14. The method of claim 13, further comprising:

after receiving the selection of the base unit value, determining base unit multiples of the base unit value;

causing the base unit multiples to be displayed in the interactive interface with respective price fields;

receiving, from the vendor device, a price entry for each of the respective price fields; and adding, via the server, the base unit multiples and the respective price entries to the product purchase interactive interface.

15. The method of claim 13, further comprising storing a marketplace record to a memory device associated with the server, the marketplace record including the selected agricultural product type, the selected base unit value, and the selected base unit measurement type.

16. The method of claim 15, wherein the memory device stores a plurality of available buyer types and the base unit is associated with a normal price, the method further comprising:

causing the plurality of available buyer types to be displayed in the interactive interface with respective price change fields for the base unit value with respect to the normal price;

receiving, from the vendor device, a price change entry for each of the respective price change fields; and storing, to a marketplace record, the plurality of available buyer types and the respective price change entry.

17. The method of claim 16, further comprising:

receiving, from a buyer device, an indication of a buyer type of a buyer associated with the buyer device;

calculating a price of the base unit value based on the indication of the buyer type and the respective price change entry that is located in the marketplace record; and causing the product purchase interactive interface to display the calculated price of the base unit value based on the indication of the buyer type.

18. The method of claim 17, wherein the buyer types include at least one of a wholesaler, a retailer, a guest, a frequent buyer, or a membership buyer.

19. The method of claim 13, further comprising:

causing the interactive interface to display a replenishment quantity field and a time period field;

receiving, from the vendor device via the interactive interface, a selection of a time period duration and a replenishment quantity; and storing, to a marketplace record, the time period duration and the replenishment quantity.

20. A non-transitory computer readable medium for use on a computing device containing computer-executable programming instructions for inventory management of agricultural products, the instructions comprising:

generating, on a vendor device, an interactive interface for inventory management, wherein the interactive interface includes an agricultural product type field, a base unit values field, and a base unit measurement type field;

receiving, from the vendor device via the interactive interface, a selection of an agricultural product type in the agricultural product type field of the interactive interface;

determining a plurality of available base unit values and a plurality of available base unit measurement types for the selected agricultural product type, the determined plurality of available base unit values corresponding to smallest units that are offered for purchase for a base unit measurement type;

causing the plurality of available base unit values to be selectable from the base unit values field and the plurality of available base unit measurement types to be selectable from the base unit measurement type field of the interactive interface;

receiving, from the vendor device, a selection of a base unit value and a base unit measurement type;

creating a product purchase interactive interface using the selected agricultural product type, the selected base unit value, and the selected base unit measurement type to enable a buyer to purchase the agricultural product type in one or more increments of the base unit value at the base unit measurement type; and for each transaction using the product purchase interactive interface, creating a transaction token to tokenize a digital payment for the respective transaction, the transaction token including at least identification of the selected agricultural product type, the selected base unit value, the selected base unit measurement type, and a deposit amount.

* * * * *